Nov. 28, 1939.   H. NOVACK   2,181,495
PLATFORM NEST FOR BIRDS
Filed June 26, 1939
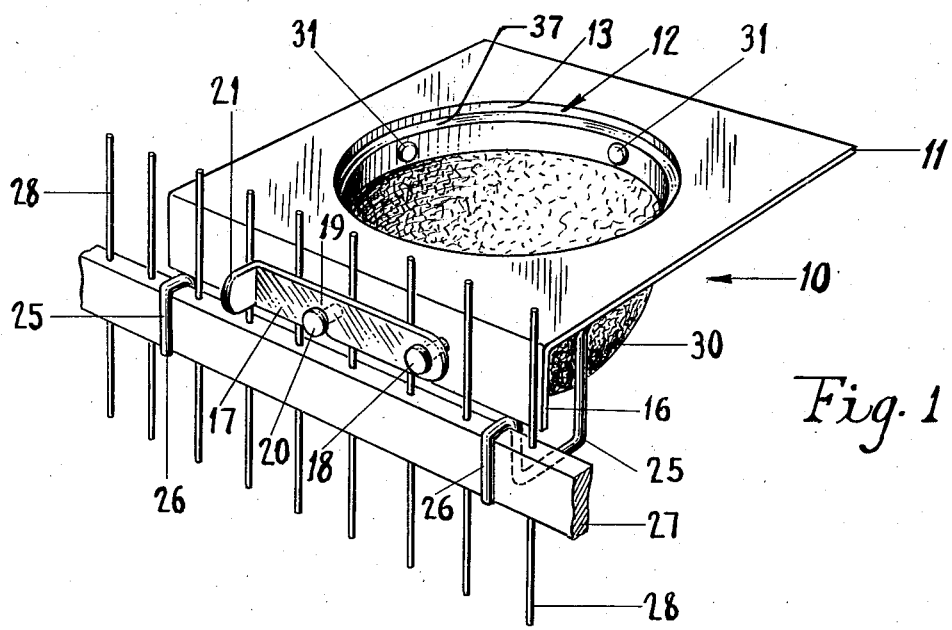
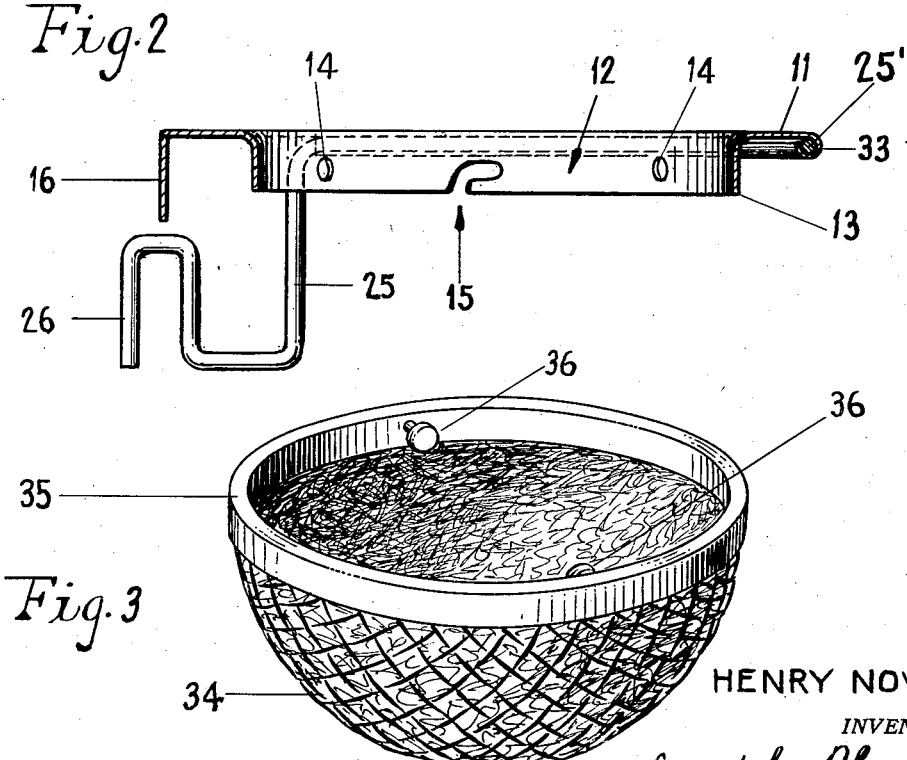
HENRY NOVACK
*INVENTOR.*
BY *Joseph Blacker*
ATTORNEY.

Patented Nov. 28, 1939

2,181,495

UNITED STATES PATENT OFFICE 2,181,495

PLATFORM NEST FOR BIRDS

Henry Novack, Brooklyn, N. Y.

Application June 26, 1939, Serial No. 281,252

4 Claims. (Cl. 119—45)

This invention relates to platform nests for bird cages having rectangular rails and designed to be used in the breeding of birds of various kinds and particularly canaries.

An object of this invention is to provide a platform nest comprising a metallic platform having U-shaped arms positioned below its upper surface and designed for engagement with a rectangular rail of a bird cage, the platform having an aperture defined by a downwardly directed annular member and a brimless semi-spherical concave nest body detachably mounted in the annular member with its upper surface slightly below the upper surface of the platform.

Another object of this invention is to provide a metallic platform having arms positioned below its upper surface and designed for engagement with a rail of a bird cage, the platform having an aperture defined by a downwardly directed annular member having openings therethrough for detachably securing a bird nest to the platform and with the upper surface of the platform at a higher elevation than the rail.

Another object of this invention is to form the said platform with a right-angular extension facing downwardly at one end and to provide a latch pivotally mounted on said extension in spaced relation therewith, the spacing being substantially the same as the thickness of the wire bars of the cage, whereby when the platform is mounted on a bird cage rail with the arms resting on a rail and with the extension in contact with one face of a wall of the cage, rotation of the latch on the opposite face of the wall will lock the platform securely to the bird cage for preventing vibration of said platform.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a perspective view of a part of a bird cage showing the improved platform nest mounted in connection therewith.

Figure 2 is a central cross-sectional view of the platform shown in Figure 1.

Figure 3 is a perspective view of a modified nest having a metal rim and headed pins adapted for bayonet joint connection.

In the illustrated embodiment of the invention the numeral 10 indicates a platform nest comprising a platform 11 having an aperture 12 centrally thereof. As best shown in Figure 2, the aperture 12 is defined by a downwardly directed annular member 13. The member 13 has four apertures 14 positioned in diametrical relation. The member 13 is also formed with bayonet slots 15.

One edge of the platform 11 has been turned downwardly, forming right-angular extension 16. A latch 17 has been pivotally mounted on a headed pin 18 in the extension 16. The latch 17 has a substantially semi-circular opening 19 designed for engagement with a headed pin 20 in the extension 16. The latch may have a handle 21 angularly positioned at its free end.

Arms 25, having substantially U-shaped ends 26, have been integrally secured to the platform 11 below its lower surface. The arms extend outwardly beyond the angular extension 16 so as to be adapted for engagement with a rectangular rail 27 of a bird cage and with the wall extension 16 in contact with one face of a wall of the cage, the wall being made up of bars 28.

As shown in Figure 1, a semi-spherical concave nest body 30 has been mounted in the platform 11 with the upper surface of the nest body slightly below the upper surface of the platform. Fasteners 31, each having a head and two bendable arms, are passed through the felted nest body and through the apertures 14 in the annular member 13 and the arms are then bent and secure the nest body and the platform in unitary relation. In the position shown in Figure 1, the nest body is wholly below the platform level and this permits the cleaning and scraping of the platform without damaging the nest body.

It is to be noted that the latch 17 has been mounted in spaced parallel relation with the extension 16, the spacing being substantially the same as the thickness of the bars 28 of the cage. The platform nest 10 may thus be mounted on the bird cage with the extension 16 in contact with one face of a wall of the cage and by rotating the latch on the opposite face of the wall, the platform and nest becomes securely locked to the cage.

As shown in Figure 2, three edges of the platform 11 may be rolled over the wire 25' forming a continuation of the arms 25 to form a roll edge 33 for reinforcing the platform against bending.

While the platform 11 is primarily designed for attachment thereto of a concave nest body 30 of fibrous materials such as I have disclosed in my Patent No. 2,165,295 by means of the fasteners 31, it is to be noted that my platform is also adapted for supporting a nest 34 provided with a metal rim 35. As shown in Figure 3, I provide headed pins 36 secured to the rim 35 and facing inwardly of the nest 34.

The user may mount the nest 34 around the annular member 13, with the headed pins 36 inside the bayonet slots 15, and by partial rotation of the said pins in the said slots, cause the nest 34 to be secured in unitary relation with the platform 11.

It is also to be noted that nests made of wire and having headed pins 36 in the annular metallic rim thereof, arranged as shown in Figure 3, may also be interchangeably mounted with the platform 11.

The importance of the easily detachable bayonet connection is that it makes possible for the breeder to remove the nest body from the cage when transferring eggs deposited therein, and replacing with artificial eggs, with the viewpoint of having all the eggs hatched on the same date. In prior practice, it was necessary for the breeder to insert his hand into the cage and into the nest to remove the natural eggs and replace them with artificial eggs. In many instances the natural eggs were destroyed during such removal.

It is to be noted that when the fasteners 31 are used for securing the nest body 30 to the annular member 13, that the fasteners should pass through the bound upper portion or rim 37 of the nest, the said bound rim being then preferably made of washable fabric.

It is also to be noted that the latch 17 when in locked position to the bars of the cage prevents vibration and holds the platform nest firmly when the bird hops into and out of the nest. This non-vibratable feature serves a very useful purpose in the hatching of canary eggs, as experience has shown that continuous vibration of a nest containing eggs to be hatched destroys life in the eggs.

I claim:

1. In a platform nest for bird cages having rectangular rails, comprising a metallic platform having U-shaped arms positioned below its upper surface and designed for engagement with one of said rails for supporting said platform nest in horizontal position, said platform having an aperture defined by a downwardly directed annular member, a semi-spherical concave nest body mounted in said annular member slightly below the upper surface of said platform, said annular member having apertures, and fasteners passing through said nest body and through said apertures for securing said nest body and platform in unitary relation, said nest body being wholly below said platform level to permit cleaning and scraping of said platform without damaging said nest body.

2. In a platform nest for bird cages having rectangular rails, comprising a metallic platform having arms positioned below its upper surface and designed for engagement with one of said rails for supporting said platform nest, said platform having an aperture defined by a downwardly directed annular member, a semi-spherical concave and brimless nest body mounted in said annular member below the upper surface of said platform, said annular member having apertures, and fasteners passing through said nest body and through said apertures for securing said nest body and platform in unitary relation, said nest body being wholly below said platform level to permit cleaning and scraping of said platform without damaging said nest body.

3. In a platform nest for bird cages having wire bars and rails, comprising a metallic platform having arms positioned below its upper surface and designed for engagement with one of said rails for supporting said platform nest, said platform having an aperture defined by a downwardly directed annular member, said annular member having openings therethrough, said platform having a right-angular extension facing downwardly at one end, a latch pivotally mounted on said extension in spaced parallel relation therewith, said spacing being substantially the same as the thickness of said wire bars, whereby when said platform is mounted on a bird cage rail with said extension in contact with one face of a wall of said cage, rotation of said latch on the opposite face of said wall will lock said platform securely to said cage.

4. In a platform nest for bird cages having wire bars and rails, comprising a metallic platform having arms positioned below its upper surface and designed for engagement with one of said rails for supporting said platform nest, said platform having an aperture defined by a downwardly directed annular member, a semi-spherical concave and brimless nest body in engagement with said annular member below the upper surface of said platform, said annular member having apertures shaped like slots of bayonet joints, and headed pins in said nest body and in detachable engagement with said apertures for securing said nest body and platform in unitary relation, said nest body being wholly below said platform level to permit cleaning and scraping of said platform without damaging said nest body.

HENRY NOVACK.